US012687520B2

(12) United States Patent
Miseikis

(10) Patent No.: US 12,687,520 B2
(45) Date of Patent: Jul. 21, 2026

(54) INFORMATION PROCESSING DEVICE AND INFORMATION PROCESSING METHOD

(71) Applicant: Sony Group Corporation, Tokyo (JP)

(72) Inventor: Justinas Miseikis, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 321 days.

(21) Appl. No.: 18/115,803

(22) Filed: Mar. 1, 2023

(65) Prior Publication Data

US 2023/0288376 A1 Sep. 14, 2023

(30) Foreign Application Priority Data

Mar. 8, 2022 (EP) .................................... 22160794

(51) Int. Cl.
*G01N 29/07* (2006.01)
*G01N 29/14* (2006.01)
*G01N 29/44* (2006.01)

(52) U.S. Cl.
CPC ............. *G01N 29/07* (2013.01); *G01N 29/14* (2013.01); *G01N 29/4481* (2013.01); *G01N 2291/0232* (2013.01); *G01N 2291/0258* (2013.01)

(58) Field of Classification Search
CPC ........... G01N 29/07; G01N 2291/0232; G01N 2291/0258; G01N 29/4481; G01N 29/2914
USPC .......................................................... 73/597
See application file for complete search history.

(56) References Cited

U.S. PATENT DOCUMENTS

| | | | | |
|---|---|---|---|---|
| 5,765,119 A | * | 6/1998 | Otabe | B60T 8/172 |
| | | | | 701/80 |
| 2004/0138831 A1 | | 7/2004 | Watanabe et al. | |
| 2007/0256499 A1 | * | 11/2007 | Pelecanos | G01H 1/00 |
| | | | | 73/579 |
| 2011/0200199 A1 | | 8/2011 | Wakao | |
| 2013/0018575 A1 | * | 1/2013 | Birken | G01S 13/00 |
| | | | | 701/514 |
| 2013/0170701 A1 | | 7/2013 | Suzuki et al. | |
| 2016/0221581 A1 | | 8/2016 | Talwar et al. | |
| 2018/0068495 A1 | | 3/2018 | Chainer et al. | |
| 2020/0003588 A1 | * | 1/2020 | Huang | G06Q 50/40 |
| 2021/0014592 A1 | * | 1/2021 | Kitagawa | G01M 17/02 |
| 2022/0219704 A1 | * | 7/2022 | Wang | H04R 1/222 |
| 2022/0310063 A1 | * | 9/2022 | Sima | G10L 21/003 |
| 2025/0093498 A1 | * | 3/2025 | Shabtay | G01S 13/881 |

OTHER PUBLICATIONS

Pieter Swart and Beatrys Lacquet, "An Acoustic Sensor System for Determination of Macroscopic Surface Roughness", Oct. 5, 1996; Published in IEEE Transactions on instrumentation and measurement, vol. 45 (Year: 1996).*
Ramos-Romero et al., "Asphalt-surface defects detection, based on tyre/road noise analysis and geo-processing", Proceedings of the 23rd International Congress on Acoustics, Available Online At: https://www.researchgate.net/publication/337185965_Asphalt-surface_defects_detection_based_on_tyreroad_noise_analysis_and_geo-processing, Sep. 9-13, 2019, pp. 7195-7199.

* cited by examiner

*Primary Examiner* — Peter J Macchiarolo
*Assistant Examiner* — John M Royston
(74) *Attorney, Agent, or Firm* — XSENSUS LLP

(57) ABSTRACT

An information processing device, comprising circuitry configured to:
obtain sound data representing a sound of an environment of a recording device; and
classify, based on the sound data, a ground surface of the environment.

12 Claims, 4 Drawing Sheets

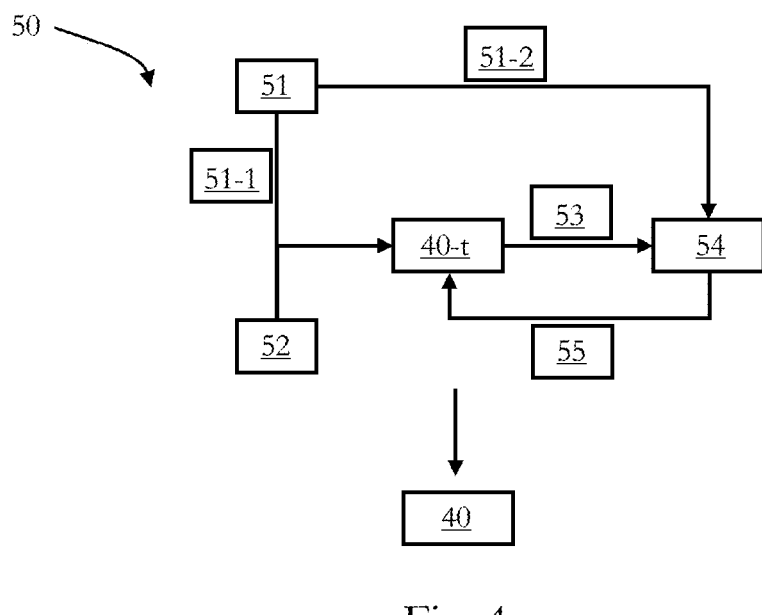

| Acquiring sound data with a recording device and sensor data with at least one sensor 101 |
| Obtaining the sound data representing a sound of an environment of the recording device 102 |
| Obtaining the sensor data representing at least one of a movement and vibration of the recording device 103 |
| Classifying, based on the sound data and the sensor data, a ground surface of the environment 104 |
| Inputting the sound data and the sensor data into a machine learning algorithm, wherein the machine learning algorithm is trained to classify the ground surface of the environment based on the sound data and the sensor data 105 |

Fig. 5

INFORMATION PROCESSING DEVICE AND INFORMATION PROCESSING METHOD

CROSS-REFERENCE TO RELATED APPLICATION

This application claims priority to European Application No. 22160794.8, filed Mar. 8, 2022, the entire contents of which are incorporated herein by reference.

TECHNICAL FIELD

The present disclosure generally pertains to an information processing device and an information processing method.

TECHNICAL BACKGROUND

Generally, global and street level maps are known which are available to a wide range of users and also provide side information about the places around the world. Typically, visual information is made available as side information in addition to the map information (e.g., location, street name, name of buildings, etc.), for example, images of the places are made available.

However, for driving, cycling and walking navigation, in some cases, additional information may be beneficial.

Although there exist techniques for providing additional information to digital maps, it is generally desirable to improve the existing techniques.

SUMMARY

According to a first aspect the disclosure provides an information processing device, comprising circuitry configured to:

obtain sound data representing a sound of an environment of a recording device; and classify, based on the sound data, a ground surface of the environment.

According to a second aspect the disclosure provides an information processing method, comprising:

obtaining sound data representing a sound of an environment of a recording device; and classifying, based on the sound data, a ground surface of the environment.

Further aspects are set forth in the dependent claims, the following description and the drawings.

BRIEF DESCRIPTION OF THE DRAWINGS

Embodiments are explained by way of example with respect to the accompanying drawings, in which:

FIG. 4 schematically illustrates in a block diagram an embodiment of a training method of a neural network for classifying a ground surface; and FIG. 5 schematically illustrates in a flow diagram an embodiment of an information processing method.

DETAILED DESCRIPTION OF EMBODIMENTS

Figure 1:
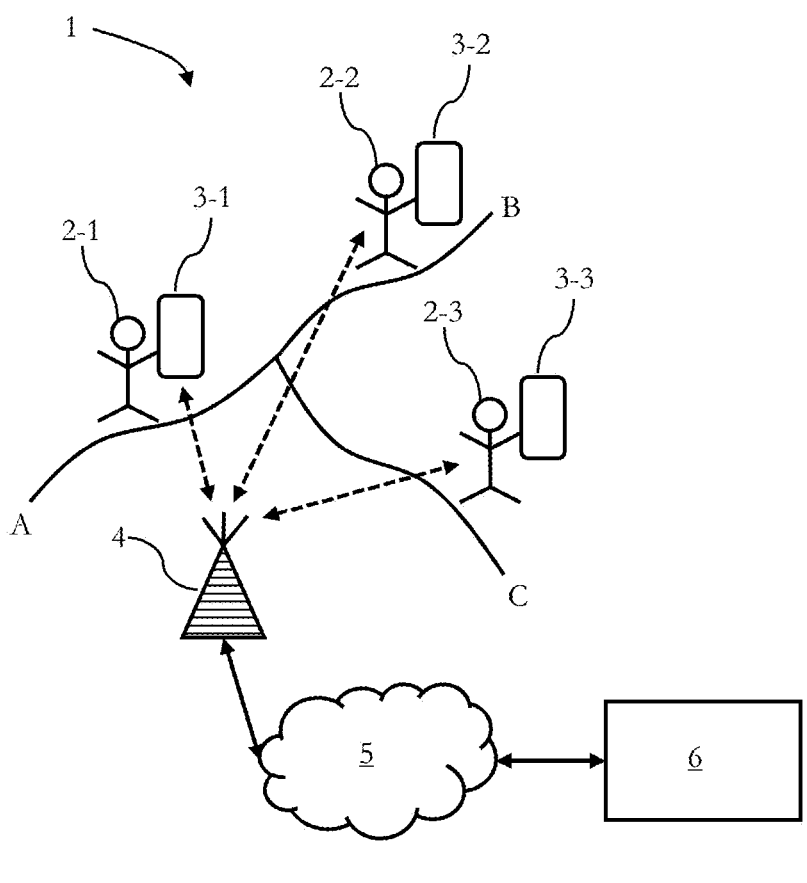
FIG. 1 schematically illustrates an embodiment of an information processing system.

Before a detailed description of the embodiments under reference of FIG. 1 is given, general explanations are made.

As mentioned in the outset, generally, global and street level maps are known which are available to a wide range of users and also provide side information about the places around the world. Typically, visual information is made available as side information in addition to the map information (e.g., location, street name, name of buildings, etc.), for example, images of the places are made available.

However, it has been recognized that for driving, cycling and walking navigation additional information may be beneficial.

In some embodiments, one type of information is the quality of the ground surface, so that navigation may take into consideration not only the allowed speed limits, but also how smooth or rough the surface is, for example, whether it is good/bad quality asphalt, gravel or any other type of ground surface. Additionally or alternatively, in some embodiments, any damages, like potholes, debris, trash on the road is detected.

It has been recognized that even though visual cameras may provide such information, it may be difficult in some cases to estimate the ground surface properties using visual information only.

It has thus been recognized that audio/sound is informative, as, for example, the sound of tyres, wheels and even shoes interacting with the surface may provide a useful information (even people are typically able to obtain such information from the sound alone).

Moreover, it has been recognized that, in addition to audio/sound, some movement and vibration information may be used, in some embodiments, for surface classification, for example, for driving and riding, it may provide useful information for improving the classification accuracy.

It is thus envisaged to utilize audio/sound input from any source, optionally utilize IMU ("Inertial Measurement Unit") information as well, and combine it with localization based on GPS ("Global Positioning System") or other known methods for localization. In some embodiments, as a user moves along the streets, sidewalks and paths, audio/sound information is acquired and classified to identify at least one of the surface type, roughness, condition and damages and/or obstacles.

Hence, some embodiments pertain to an information processing device, wherein the information processing device includes circuitry configured to:

obtain sound data representing a sound of an environment of a recording device; and classify, based on the sound data, a ground surface of the environment.

The information processing device may be a mobile device (e.g., a smartphone, tablet, etc.), a wearable device (e.g., a smart watch, smart glasses, earphones, etc.), a server, a computer in a cloud computing environment, a board computer of a(n) (autonomous) vehicle or the like.

The circuitry may be based on or may include or may be implemented by typical electronic components configured to achieve the functionality as described herein.

The circuitry may be based on or may include or may be implemented as integrated circuitry logic and the functionality may be implemented by software executed by a processor or the like. The circuitry may be based on or may include or may be implemented by a CPU (central processing unit), a microcontroller, an FPGA (field programmable gate array), an ASIC (application specific integrated circuit), a GPU (graphical processing unit), a DSP (digital signal processor) or the like.

The circuitry may be based on or may include or may be implemented in parts by typical electronic components and integrated circuitry logic and in parts by software.

The circuitry may include storage capabilities such as magnetic storage, semiconductor storage, etc.

The circuitry may include a data bus for transmitting and receiving data and may implement corresponding communication protocols.

The (sound) recording device may include one or more microphones and circuitry configured to acquire sound data representing a sound of the environment of the (sound) recording device and to process sound signals such as filter, AD ("analog-to-digital") converters, etc., as generally known.

The (sound) recording device may be included in a mobile device, a wearable device, a GPS tracker, a vehicle, a smart city device, etc.

Hence, in some embodiments, the information processing device includes the (sound) recording device configured to acquire the sound data.

In some embodiments, classifying the ground surface includes determining at least one of a type of the ground surface, a roughness of the ground surface, a condition of the ground surface and a damage of the ground surface.

The type of ground surface in which the ground surface is classified into based on the sound data may be asphalt, gravel, sand, wood, forest ground, moss, plastic, glass, concrete, stone, paving stones, tiles, etc.

The roughness of the ground surface may be classified as flat, low roughness, medium roughness or high roughness or the like.

The condition of the ground surface may be classified as dry, wet, muddy, slippery, oily, rocky, covered with sand, covered with pebbles or the like.

The damage of the ground surface may be classified as potholes, debris, trash, obstacles or the like.

In some embodiments, the circuitry is configured to obtain sensor data representing at least one of a movement and vibration of the recording device.

In some embodiments, the information processing device includes one or more sensors configured to acquire the sensor data representing the at least one of a movement and vibration of the information processing device and, thus, of the (sound) recording device.

For example, the information processing device may include an IMU ("Inertial Measurement Unit") configured to acquire the sensor data, wherein the sensor data are acceleration and rotation data of the information processing device representing the at least one of a movement and vibration of the information processing device and, thus, of the (sound) recording device.

It has been recognized that the sensor data may improve accuracy of the classification, since, for example, the sound generated by a user on the ground surface typically depends on the movement state (e.g., abrupt braking may generate a characteristic sound depending on the ground surface).

Moreover, it has been recognized that, for example, generated vibrations typically depend on the ground surface (e.g., an asphalt street may generate different vibrations than a gravel street).

Hence, in some embodiments, the circuitry is configured to classify the ground surface of the environment further based on the sensor data.

In some embodiments, the audio/sound data is processed using artificial neural networks, either on device, cloud or servers. This may allow crowdsourcing of the information by having users using simple navigation or other apps. A quality of the classification and ground surface type maps may improve with the user base and may be merged with other mapping services to provide maps including accurate ground surface estimation around the world.

Hence, in some embodiments, the circuitry is configured to input the sound data into a machine learning algorithm, wherein the machine learning algorithm is trained to classify the ground surface of the environment based on the sound data.

The machine learning algorithm may be a(n) (artificial) neural network, a decision tree, a support vector machine or the like.

In some embodiments, the circuitry is configured to further input the sensor data into the machine learning algorithm, wherein the machine learning algorithm is trained to classify the ground surface of the environment further based on the sensor data.

In some embodiments, the circuitry is configured to obtain location data representing a location of the recording device and to associate a classification result of the ground surface with the location.

In some embodiments, the information processing device includes the (sound) recording device and a GNSS ("Global Navigation Satellite System") sensor to acquire the location data thus representing the location of the (sound) recording device.

The classification result may include at least one of a type of the ground surface, a roughness of the ground surface, a condition of the ground surface and a damage of the ground surface.

In some embodiments, the associated location and classification result of the ground surface is provided as side information in a (digital) map.

Some embodiments pertain to an information processing method, wherein the information processing method includes:

obtaining sound data representing a sound of an environment of a recording device; and classifying, based on the sound data, a ground surface of the environment.

The information processing method may be performed by the information processing device as described herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is schematically illustrated an embodiment of an information processing system 1, which is discussed in the following.

The information processing system 1 includes a first mobile device 3-1 carried by a first user 2-1, a second mobile device 3-2 carried by a second user 2-2 and a third mobile device 3-3 carried by a third user 2-3.

The first user 2-1 moves on path A which is an asphalt road. The first mobile device 3-1 communicates via a base station 4 over a network 5 with a server 6.

The first mobile device 3-1 includes a sound recording device (not shown) which acquires continuously sound data and location data and optionally sensor data while the first user 2-1 moves on the asphalt road.

The second user 2-2 moves on path B which is a gravel road. The second mobile device 3-2 communicates via the base station 4 over the network 5 with the server 6.

The second mobile device 3-2 includes a sound recording device (not shown) which acquires continuously sound data and location data and optionally sensor data while the second user 2-2 moves on the gravel road.

The third user 2-3 moves on path C which is a forest ground. The third mobile device 3-3 communicates via the base station 4 over the network 5 with the server 6.

The third mobile device 3-3 includes a sound recording device (not shown) which acquires continuously sound data and location data and optionally sensor data while the third user 2-3 moves on the forest ground.

The server 6 stores map data representing a digital map of the paths A-C which can be provided to the first, second and third mobile device 3-1, 3-2 and 3-3 via the network 5 and the base station 4 (which provide a communication channel) for navigation.

Figure 2:
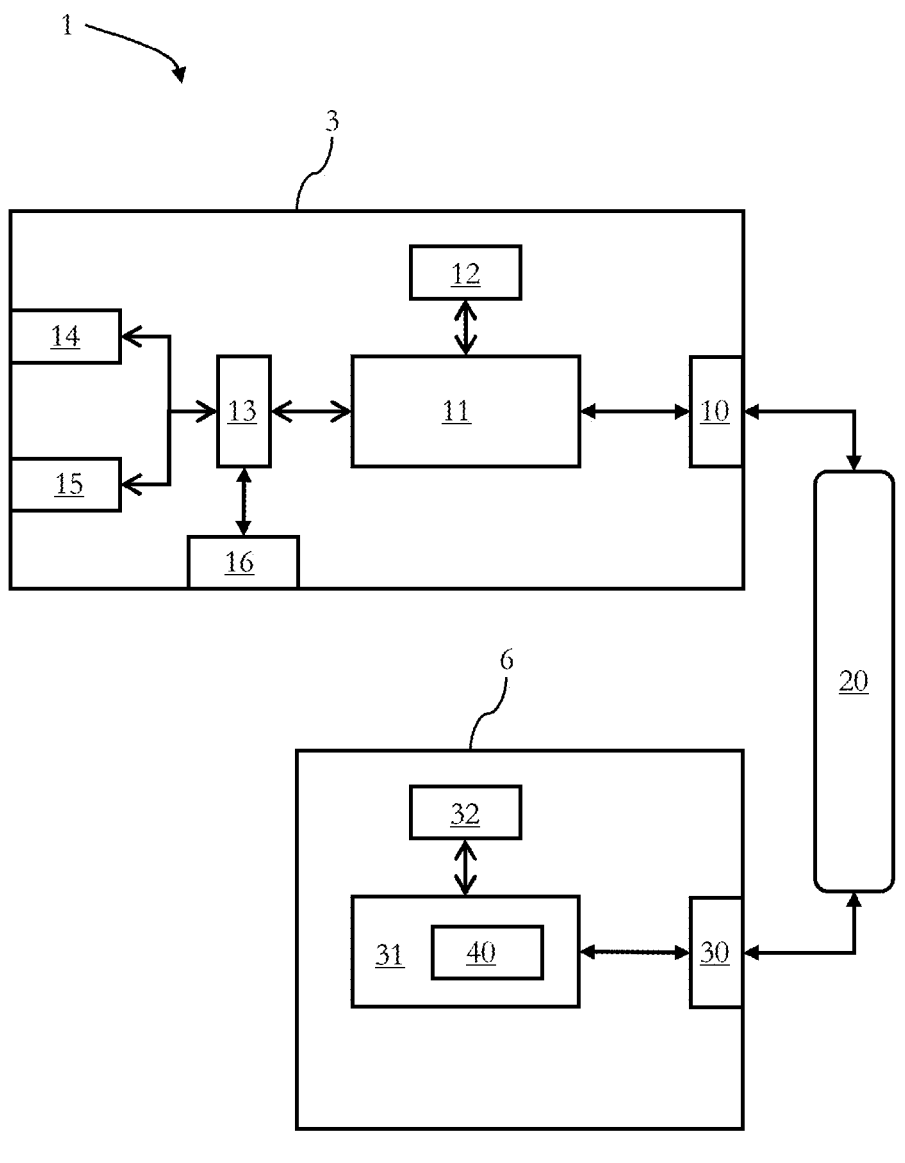
FIG. 2 schematically illustrates in a block diagram an embodiment of an information processing system.

FIG. 2 schematically illustrates in a block diagram the embodiment of the information processing system 1, which is discussed in the following.

In the information processing system 1 of FIG. 2, the reference number 3 represents one of the mobile devices 3-1, 3-2 and 3-3 of FIG. 1 and the reference number 20 the communication channel provided by the base station 4 and the network 5 of FIG. 1.

The mobile device 3 includes a first communication interface 10, a first processor 11, a first data storage 12, a data bus 13, a sound recording device 14, optionally an IMU 15 (as the sensor) and a GPS sensor 16.

The first processor 11 loads a computer-program from the first data storage 12 and executes the computer-program. The computer-program includes instructions such that the first processor 11 instructs, via the data bus 13 (e.g., a data bus in accordance with MIPI ("Mobile Industry Processor Interface Alliance") specifications), the sound recording device 14 to acquire sound data, the GPS sensor 16 to acquire location data and optionally the IMU 15 to acquire sensor data.

Then, the sound recording device 14 acquires sound data representing a sound of an environment of the sound recording device 14. Generally, the sound may be generated by the respective user 2-1, 2-2 and 2-3 while moving on the respective path A, B and C or by other passengers, vehicles or sound sources present in the environment of the sound recording device 14.

The sound recording device 14 outputs the acquired sound data via the data bus 13 to the first processor 11.

The optional IMU 15 acquires sensor data representing at least one of a movement and vibration of the mobile device 3 and, thus, of the sound recording device 14.

The IMU 15 outputs the acquired sensor data via the data bus 13 to the first processor 11.

The GPS sensor 16 acquires location data representing a location of the mobile device 3 and, thus, of the sound recording device 14.

The GPS sensor 16 outputs the acquired location data via the data bus 13 to the first processor 11.

The first processor 11 outputs the sound data, the location data and optionally the sensor data to the first communication interface 10 which transmits the data via the communication channel 20 to the server 6.

The server 6 includes a second communication interface 30, a second processor 31 and a second data storage 32.

The server 6 loads a computer-program from the second data storage 32 and executes the computer program. The computer-program includes instructions such that the second processor instructs the second communication interface 30 to receive the sound data, the location data and optionally the sensor data via the communication channel 20.

The second communication interface 30 outputs the received sound data, the location data and optionally the sensor data to the second processor 31.

Moreover, the computer-program includes instructions such that the second processor 31 executes a(n) (artificial) neural network 40 (as an example of a machine learning algorithm).

The second processor 31 inputs the sound data and optionally the sensor data into the neural network 40.

The neural network 40 is trained to classify a ground surface of the environment (of the mobile device 3 and, thus, of the sound recording device 14) based on the sound data and optionally further based on the sensor data.

In other words, the neural network 40 determines (or generates) a classification result, wherein the classification result includes at least one of a type of the ground surface, a roughness of the ground surface, a condition of the ground surface and a damage of the ground surface.

The second processor 31 associates the classification result output by the neural network 40 with a location represented by the location data.

The second data storage 32 stores map data representing a digital map of the paths A-C.

Then, the second processor 31 adds the classification result to the map data according to the location with which the classification result is associated.

Figure 3:
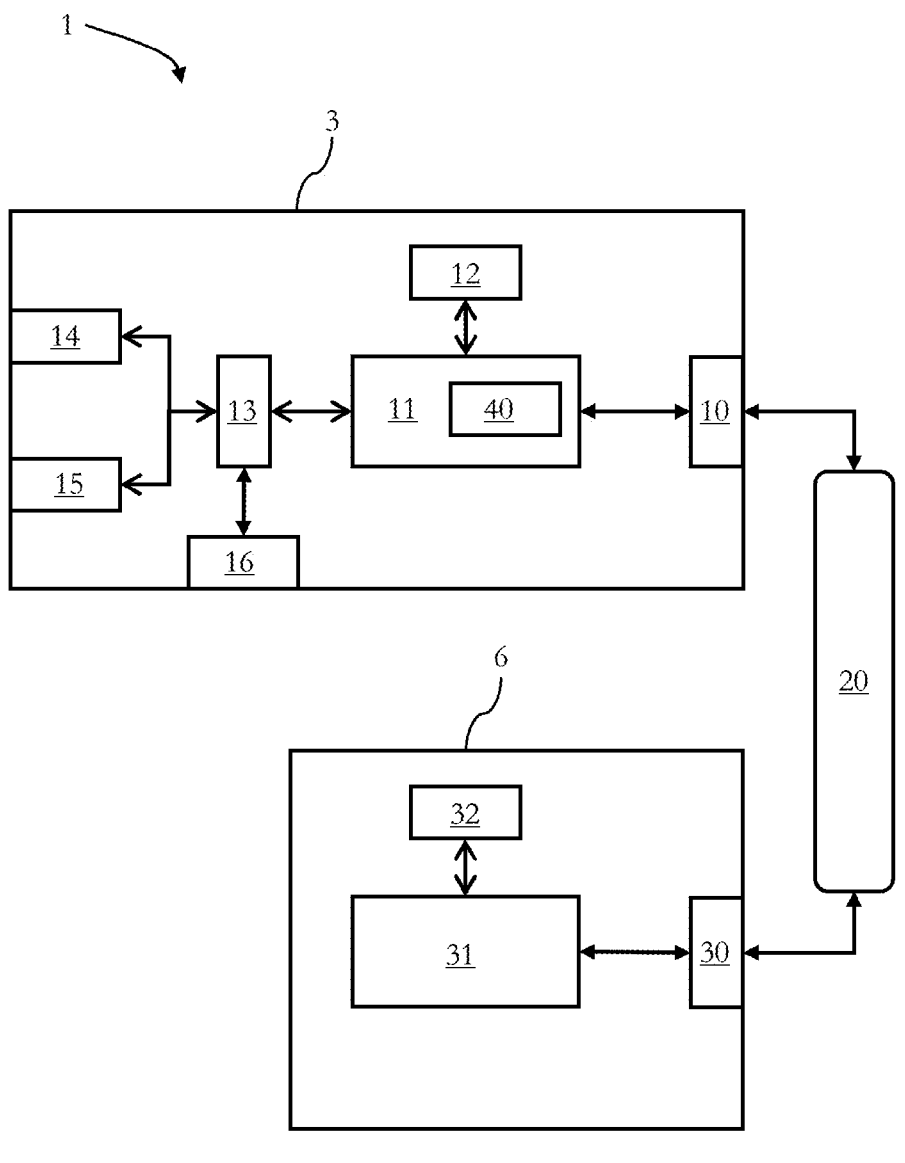
FIG. 3 schematically illustrates in a block diagram an embodiment of an information processing system.

FIG. 3 schematically illustrates in a block diagram the embodiment of the information processing system 1, which is discussed in the following.

Generally, the embodiment of the information processing system 1 of FIG. 3 is based on the embodiment of the information processing system 1 of FIG. 2 and, thus, a description of similar parts is omitted in order to avoid unnecessary repetitions.

Here, the neural network 40 is executed by the first processor 11 of the mobile device 3 instead of the second processor 31 of the server 6.

Then, the first processor 11 associates the classification result output by the neural network 40 with a location represented by the location data.

Then, the first processor 11 outputs the associated location and classification result to the first communication interface which transmits the data via the communication channel 20 to the server 6.

Then, the second communication unit 30 receives associated location and classification result and outputs the associated location and classification result to the second processor 31.

The second processor 31 adds the classification result to the map data according to the location with which the classification result is associated.

A training method of the neural network 40 will be discussed in the following under reference of FIG. 4.

FIG. 4 schematically illustrates in a block diagram an embodiment of a training method 50 of the (artificial) neural network 40 for classifying a ground surface, which is discussed in the following.

In the beginning of the training method 50, the neural network 40 is in a training stage 40-*t*.

The training method 50 is based on ground-truth sound data 51, in particular, the ground-truth sound data 51 include a plurality of sound data portions acquired with a sound recording device.

Each sound data portion of the plurality of sound data portions represents a sound of an environment of the sound recording device, wherein the sound of one sound data portion is generated in a known movement state (e.g., walking, riding with a bike, driving with a car, etc.) on a known ground surface type with a known ground surface roughness and with known ground surface conditions and with known ground surface damages.

Each sound data portion 51-1 of the plurality of sound data portions is associated with a label 51-2 representing a classification result of the sound data portion, wherein the label includes at least one of a type of the ground surface, a roughness of the ground surface, a condition of the ground surface and a damage of the ground surface.

The training method 50 is further based on ground-truth sensor data 52, in particular, the ground-truth sensor data 52 include a plurality of sensor data portions acquired with an IMU.

Each sensor data portion of the plurality of sensor data portions is associated with one sound data portion of the plurality of sound data portions 51-1.

The following describes the training for one sound data portion and an associated sensor data portion which is then repeated for the other sound/sensor data portions.

The sound data portion 51-1 and the associated sensor data portion of the ground-truth sensor data 52 are input into in the neural network 40-$t$ in the training stage.

The neural network 40-$t$ in the training stage generates a classification result 53.

A loss function 54 generates, based on a difference between the label 51-2 and the classification result 53, weight updates 55 for the neural network 40-$t$ in the training stage.

The process is repeated until all sound data portions and associated sensor data portions are processed.

Then, at the end of the training method 50, the weights are obtained and, thus, the neural network 40 is obtained.

In some embodiments, as the contact object such as tyres, wheels, shoes are made of different materials, the resulting sound can differ from user to user. However, in some embodiments, general audio properties may stay the same and could be adapted at the classification level using the artificial neural network by utilizing adaptive methods such as transfer learning.

FIG. 5 schematically illustrates in a flow diagram an embodiment of an information processing method 100, which is discussed in the following.

At 101, sound data is acquired with a recording device and sensor data is acquired with at least one sensor, as discussed herein.

At 102, the sound data is obtained representing a sound of an environment of the recording device, as discussed herein.

At 103, the sensor data is obtained representing at least one of a movement and vibration of the recording device, as discussed herein.

At 104, based on the sound data and the sensor data, a ground surface of the environment is classified, as discussed herein.

At 105, the sound data and the sensor data is input into a machine learning algorithm, wherein the machine learning algorithm is trained to classify the ground surface of the environment based on the sound data and the sensor data, as discussed herein.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An information processing device, including circuitry configured to:

obtain sound data representing a sound of an environment of a recording device; and classify, based on the sound data, a ground surface of the environment.

(2) The information processing device of (1), wherein classifying the ground surface includes determining a type of the ground surface.

(3) The information processing device of (1) or (2), wherein classifying the ground surface includes determining a roughness of the ground surface.

(4) The information processing device of anyone of (1) to (3), wherein classifying the ground surface includes determining a condition of the ground surface.

(5) The information processing device of anyone of (1) to (4), wherein classifying the ground surface includes determining a damage of the ground surface.

(6) The information processing device of anyone of (1) to (5), wherein the circuitry is configured to obtain sensor data representing at least one of a movement and vibration of the recording device.

(7) The information processing device of (6), wherein the circuitry is configured to classify the ground surface of the environment further based on the sensor data.

(8) The information processing device of anyone of (1) to (7), wherein the circuitry is configured to obtain location data representing a location of the recording device and to associate a classification result of the ground surface with the location.

(9) The information processing device of anyone of (1) to (8), wherein the circuitry is configured to input the sound data into a machine learning algorithm, wherein the machine learning algorithm is trained to classify the ground surface of the environment based on the sound data.

(10) The information processing device of anyone of (1) to (9), including the recording device configured to acquire the sound data.

(11) An information processing method, including:

obtaining sound data representing a sound of an environment of a recording device; and classifying, based on the sound data, a ground surface of the environment.

(12) The information processing method of (11), wherein classifying the ground surface includes determining a type of the ground surface.

(13) The information processing method of (11) or (12), wherein classifying the ground surface includes determining a roughness of the ground surface.

(14) The information processing method of anyone of (11) to (13), wherein classifying the ground surface includes determining a condition of the ground surface.

(15) The information processing method of anyone of (11) to (14), wherein classifying the ground surface includes determining a damage of the ground surface.

(16) The information processing method of anyone of (11) to (15), including: obtaining sensor data representing at least one of a movement and vibration of the recording device.

(17) The information processing method of (16), including: classifying the ground surface of the environment further based on the sensor data.

(18) The information processing method of anyone of (11) to (17), including: obtaining location data representing a location of the recording device and associating a classification result of the ground surface with the location.

(19) The information processing method of anyone of (11) to (18), including: inputting the sound data into a machine learning algorithm, wherein the machine learning algorithm is trained to classify the ground surface of the environment based on the sound data.

(20) The information processing method of anyone of (11) to (19), including: acquiring the sound data with the recording device.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. An information processing device, comprising circuitry configured to:

obtain sound data representing a sound generated by interaction between a contact object and a ground surface of an environment of a recording device, obtain sensor data representing at least one of a movement and vibration of the recording device, classify, based on the sound data and the sensor data, the ground surface of the environment using an artificial neural network trained using a plurality of ground-truth sound data portions, each ground-truth sound data portion acquired during a known movement state on a ground surface having known physical characteristics, the artificial neural network being trained to distinguish between different ground surface types, conditions, and damages based on audio properties of the sound data, wherein the artificial neural network is adaptable to different contact object materials using transfer learning, obtain location data representing a location of the recording device, associate a classification result of the ground surface with the location, and provide the associated location and classification result as side information in a digital map to enabling route planning that considers ground surface conditions based on physical properties of the ground surface that are determinable from the sound generated by the interaction between the contact object and the ground surface.

2. The information processing device according to claim 1, wherein classifying the ground surface includes determining a type of the ground surface.

3. The information processing device according to claim 1, wherein classifying the ground surface includes determining a roughness of the ground surface.

4. The information processing device according to claim 1, wherein classifying the ground surface includes determining a condition of the ground surface.

5. The information processing device according to claim 1, wherein classifying the ground surface includes determining a damage of the ground surface.

6. The information processing device according to claim 1, comprising the recording device configured to acquire the sound data.

7. An information processing method, comprising:

obtaining sound data representing a sound generated by interaction between a contact object and a ground surface of an environment of a recording device;

classifying, based on the sound data and the sensor data, the ground surface of the environment using an artificial neural network trained using a plurality of ground-truth sound data portions, each ground-truth sound data portion acquired during a known movement state on a ground surface having known physical characteristics, the artificial neural network being trained to distinguish between different ground surface types, conditions, and damages based on audio properties of the sound data, wherein the artificial neural network is adaptable to different contact object materials using transfer learning;

obtaining location data representing a location of the recording device;

associating a classification result of the ground surface with the location; and providing the associated location and classification result as side information in a digital map to enabling route planning that considers ground surface conditions based on physical properties of the ground surface that are determinable from the sound generated by the interaction between the contact object and the ground surface.

8. The information processing method according to claim 7, wherein classifying the ground surface includes determining a type of the ground surface.

9. The information processing method according to claim 7, wherein classifying the ground surface includes determining a roughness of the ground surface.

10. The information processing method according to claim 7, wherein classifying the ground surface includes determining a condition of the ground surface.

11. The information processing method according to claim 7, wherein classifying the ground surface includes determining a damage of the ground surface.

12. The information processing method according to claim 7, comprising: acquiring the sound data with the recording device.

* * * * *